(12) United States Patent
Streuer

(10) Patent No.: US 7,612,535 B2
(45) Date of Patent: Nov. 3, 2009

(54) CHARGE INDICATOR

(75) Inventor: Peter Streuer, Hannover (DE)

(73) Assignee: VB Autobatterie GmbH, Hannover (DE)

( * ) Notice: Subject to any disclaimer, the term of this patent is extended or adjusted under 35 U.S.C. 154(b) by 393 days.

(21) Appl. No.: 11/802,767

(22) Filed: May 24, 2007

(65) Prior Publication Data

US 2007/0279007 A1  Dec. 6, 2007

(51) Int. Cl.
*H01M 10/46* (2006.01)
(52) U.S. Cl. ...................................................... 320/132
(58) Field of Classification Search ................. 320/107, 320/112, 114, 132, 149; 324/426, 427, 430, 324/433; 429/61, 90, 91
See application file for complete search history.

(56) References Cited

U.S. PATENT DOCUMENTS

| | | |
|---|---|---|
| 3,906,329 A | 9/1975 | Bader |
| 4,153,867 A | 5/1979 | Jungfer et al. |
| 4,193,025 A | 3/1980 | Frailing et al. |
| 4,207,611 A | 6/1980 | Gordon |
| 4,308,817 A | 1/1982 | Peterson |
| 4,322,685 A | 3/1982 | Frailing et al. |
| 4,595,880 A | 6/1986 | Patil |
| 4,642,600 A | 2/1987 | Gummelt et al. |
| 4,659,977 A | 4/1987 | Kissel et al. |
| 4,665,370 A | 5/1987 | Holland |
| 4,719,427 A | 1/1988 | Morishita et al. |
| 4,816,736 A | 3/1989 | Dougherty et al. |
| 4,876,513 A | 10/1989 | Brilmyer et al. |
| 4,888,716 A | 12/1989 | Ueno |
| 4,937,528 A | 6/1990 | Palanisamy |
| 4,943,777 A | 7/1990 | Nakamura et al. |
| 4,952,861 A | 8/1990 | Horn |
| 5,002,840 A | 3/1991 | Klebenow et al. |

(Continued)

FOREIGN PATENT DOCUMENTS

DE   22 42 410   3/1973

(Continued)

OTHER PUBLICATIONS

Baert, D., Vervaet, A., Lead-Acid Battery Model for the Derivation of Peukert's Law, Mar. 8, 1999, 14 pages, vol. 44, Elsevier Science, Ltd., Germany.

(Continued)

*Primary Examiner*—Edward Tso
(74) *Attorney, Agent, or Firm*—Lathrop & Clark LLP

(57) ABSTRACT

A charge indicator for a battery includes a transparent inspection rod comprising an observation area at a first end and a tip formed by a conical reflection area at a second end. The charge indicator also includes a ball cage that includes a gas bubble collection channel beginning between the first upper channel boundary wall of the ball guidance channel and the tip, the gas bubble collection channel extending from the lower area of the ball cage to the tip and extending obliquely toward the top to the upper boundary wall oppositely to the adjoining ball guidance channel at least from the tip. The gas bubble collection channel has in an upper area of the gas bubble collection channel a plurality of gas diversion areas running to the outsides of the ball cage in the direction of the upper area of the ball cage, starting from a central plane level with the tip.

9 Claims, 5 Drawing Sheets

U.S. PATENT DOCUMENTS

| | | | |
|---|---|---|---|
| 5,032,825 | A | 7/1991 | Kuznicki |
| 5,055,656 | A | 10/1991 | Farah et al. |
| 5,079,716 | A | 1/1992 | Lenhardt et al. |
| 5,130,699 | A | 7/1992 | Reher et al. |
| 5,159,272 | A | 10/1992 | Rao et al. |
| 5,162,164 | A | 11/1992 | Dougherty et al. |
| 5,204,610 | A | 4/1993 | Pierson et al. |
| 5,223,351 | A | 6/1993 | Wruck |
| 5,280,231 | A | 1/1994 | Kato et al. |
| 5,281,919 | A | 1/1994 | Palanisamy |
| 5,316,868 | A | 5/1994 | Dougherty et al. |
| 5,321,627 | A | 6/1994 | Reher |
| 5,352,968 | A | 10/1994 | Reni et al. |
| 5,381,096 | A | 1/1995 | Hirzel |
| 5,404,129 | A | 4/1995 | Novak et al. |
| 5,412,323 | A | 5/1995 | Kato et al. |
| 5,416,402 | A | 5/1995 | Reher et al. |
| 5,428,560 | A | 6/1995 | Leon et al. |
| 5,439,577 | A | 8/1995 | Weres et al. |
| 5,488,283 | A | 1/1996 | Dougherty et al. |
| 5,549,984 | A | 8/1996 | Dougherty |
| 5,552,642 | A | 9/1996 | Dougherty et al. |
| 5,563,496 | A | 10/1996 | McClure |
| 5,572,136 | A | 11/1996 | Champlin |
| 5,578,915 | A | 11/1996 | Crouch, Jr. et al. |
| 5,656,915 | A | 8/1997 | Eaves |
| 5,680,050 | A | 10/1997 | Kawai et al. |
| 5,698,965 | A | 12/1997 | York |
| 5,721,688 | A | 2/1998 | Bramwell |
| 5,744,936 | A | 4/1998 | Kawakami |
| 5,744,963 | A | 4/1998 | Arai et al. |
| 5,761,072 | A | 6/1998 | Bardsley, Jr. et al. |
| 5,773,977 | A | 6/1998 | Dougherty |
| 5,808,367 | A | 9/1998 | Akagi et al. |
| 5,808,445 | A | 9/1998 | Aylor et al. |
| 5,818,116 | A | 10/1998 | Nakae et al. |
| 5,818,333 | A | 10/1998 | Yaffe et al. |
| 5,896,023 | A | 4/1999 | Richter |
| 5,898,292 | A | 4/1999 | Takemoto et al. |
| 5,936,383 | A | 8/1999 | Ng et al. |
| 5,965,954 | A | 10/1999 | Johnson et al. |
| 5,977,654 | A | 11/1999 | Johnson et al. |
| 5,990,660 | A | 11/1999 | Meissner |
| 6,016,047 | A | 1/2000 | Notten et al. |
| 6,037,749 | A | 3/2000 | Parsonage |
| 6,037,777 | A | 3/2000 | Champlin |
| 6,057,666 | A | 5/2000 | Dougherty et al. |
| 6,087,808 | A | 7/2000 | Pritchard |
| 6,091,325 | A | 7/2000 | Zur et al. |
| 6,118,252 | A | 9/2000 | Richter |
| 6,118,275 | A | 9/2000 | Yoon et al. |
| 6,144,185 | A | 11/2000 | Dougherty et al. |
| 6,160,382 | A | 12/2000 | Yoon et al. |
| 6,222,341 | B1 | 4/2001 | Dougherty et al. |
| 6,268,712 | B1 | 7/2001 | Laig-Horstebrock et al. |
| 6,271,642 | B1 | 8/2001 | Dougherty et al. |
| 6,296,593 | B1 | 10/2001 | Gotou et al. |
| 6,300,763 | B1 | 10/2001 | Kwok |
| 6,304,059 | B1 | 10/2001 | Chalasani et al. |
| 6,331,762 | B1 | 12/2001 | Bertness |
| 6,369,578 | B1 | 4/2002 | Crouch, Jr. et al. |
| 6,388,421 | B2 | 5/2002 | Abe |
| 6,388,450 | B2 | 5/2002 | Richter et al. |
| 6,392,389 | B1 | 5/2002 | Kohler |
| 6,392,414 | B2 | 5/2002 | Bertness |
| 6,392,415 | B2 | 5/2002 | Laig-Horstebrock et al. |
| 6,417,668 | B1 | 7/2002 | Howard et al. |
| 6,424,157 | B1 | 7/2002 | Gollomp et al. |
| 6,441,585 | B1 | 8/2002 | Bertness |
| 6,445,158 | B1 | 9/2002 | Bertness et al. |
| 6,452,361 | B2 | 9/2002 | Dougherty et al. |
| 6,472,875 | B1 | 10/2002 | Meyer |
| 6,495,990 | B2 | 12/2002 | Champlin |
| 6,507,194 | B2 | 1/2003 | Suzuki |
| 6,515,452 | B2 | 2/2003 | Choo |
| 6,515,456 | B1 | 2/2003 | Mixon |
| 6,522,148 | B2 | 2/2003 | Ochiai et al. |
| 6,534,992 | B2 | 3/2003 | Meissner et al. |
| 6,556,019 | B2 | 4/2003 | Bertness |
| 6,600,237 | B1 | 7/2003 | Meissner |
| 6,600,293 | B2 | 7/2003 | Kikuchi |
| 6,608,482 | B2 | 8/2003 | Sakai et al. |
| 6,653,818 | B2 | 11/2003 | Laig-Horstebrock et al. |
| 2002/0008495 | A1 | 1/2002 | Dougherty et al. |
| 2002/0026252 | A1 | 2/2002 | Wruck et al. |
| 2002/0031700 | A1 | 3/2002 | Wruck et al. |
| 2003/0047366 | A1 | 3/2003 | Andrew et al. |
| 2003/0082440 | A1 | 5/2003 | Mrotek et al. |
| 2003/0142228 | A1 | 7/2003 | Flach et al. |
| 2003/0236656 | A1 | 12/2003 | Dougherty |
| 2004/0021468 | A1 | 2/2004 | Dougherty et al. |
| 2004/0041539 | A1 | 3/2004 | Streuer |

FOREIGN PATENT DOCUMENTS

| | | |
|---|---|---|
| DE | 2 242 510 C3 | 4/1974 |
| DE | 25 11 426 C2 | 9/1975 |
| DE | 33 34 128 A1 | 4/1985 |
| DE | 37 12 629 C2 | 10/1987 |
| DE | 38 08 559 A1 | 9/1989 |
| DE | 39 01 680 A1 | 3/1990 |
| DE | 40 07 883 A1 | 9/1991 |
| DE | 38 82 374 T2 | 10/1993 |
| DE | 44 14 134 A1 | 11/1994 |
| DE | 43 39 568 | 5/1995 |
| DE | 689 24 169 T2 | 3/1996 |
| DE | 195 40 827 A1 | 5/1996 |
| DE | 195 43 874 | 5/1996 |
| DE | 197 50 309 A1 | 5/1999 |
| DE | 691 31 276 T2 | 12/1999 |
| DE | 198 47 648 A1 | 4/2000 |
| DE | 694 23 918 T2 | 8/2000 |
| DE | 199 52 693 A1 | 5/2001 |
| DE | 199 60 761 C1 | 5/2001 |
| DE | 93 21 638 U1 | 8/2001 |
| DE | 100 21 161 A1 | 10/2001 |
| DE | 699 00 638 T2 | 8/2002 |
| DE | 102 24 662 C1 | 6/2003 |
| EP | 0 516 336 B1 | 2/1992 |
| EP | 1 116 958 A2 | 7/2001 |
| EP | 1 120 641 A2 | 8/2001 |
| WO | WO 97/15839 | 5/1997 |
| WO | WO 99 17128 | 4/1999 |
| WO | WO 99 66340 | 12/1999 |
| WO | WO 00/04620 | 1/2000 |
| WO | WO 01 15023 | 3/2001 |
| WO | WO 03/001224 A1 | 1/2003 |

OTHER PUBLICATIONS

Battery Alert! We're Warning You! The Easy-to-Install Battery Deterioration Warning Device, Advertisement, 2 pages, Israel.

Battery Evaluation Reports, Apr. 1999, 1 page, s.e. Ross Laboratories, Inc., Ohio, USA.

Bosch and the New E-Class, article, Nov. 2002, 1 page.

Brooke, L., Resin Keeps Batteries Cool, Product Materials, Nov. 1988, 1 page.

Coto Technology, Reed Relay Technical & Applications Information, article, 8 pages, Rhode Island, USA.

DeBardelaben, Sheldon, Determining the End of Battery Life, Conference Proceedings, Oct. 19-22, 1986, 5 pages, IEEE, New Jersey, USA.

Forecast Review, article, Nov. 1996, 1 page, The Battery Man.

Gibilisco, Stan and Sclater, Neil, Rectifier Bridge, Encyclopedia of Electronics, 1996, 4 Pages, Second Edition, Tab Professional and Reference Books, Pennsylvania, USA.

Hoover, J., Failure Modes of Batteries Removed from Service, A Presentation at the 107th Convention of Battery Council International, Apr. 30-May 3, 1995, 1 page.

HSR-003, Application Notes, 1 page, Hermetic Switch, Inc., Oklahoma, USA.

International Search Report for PCT/US02/19760 (international filing date Jun. 21, 2002), date of mailing Oct. 10, 2002, 4 pages.

Lehman, A., Electrical Battery Model For Leo Application Based on Absolute Instantaneous State of Charge, Proceedings of the European Space Power Conference held in Madrid, Spain, Oct. 2-6, 1989, 7 pages, vol. 1, ESA Publications, France.

Lurkens, P., Steffens, W., Ladezustandsschätzuntt von Bleibatterien mit Hilfe des *Kalman*-Filters, , article, 1986, 6 pages, Archiv, vol. 8, Issue 7.

Mauracher, P., & Karden, E., Dynamic Modelling of Lead/Acid Batteries Using Impedance Spectroscopy for Parameter Identification, Journal, Dec. 16, 1996, 16 pages, vol. 67 (1997) No. 1-2, Elsevier Science S.A., Germany.

Mayer, D., Biscaglia, S., Modelling and Analysis of Lead Acid Battery Operation, 6 pages, Ecole des Mines de Paris, Valbonne.

N.A. Hampson, S.A.G.R. Karunathilaka, R. Leek, The Impedance of Electrical Storage Cells, Reviews of Applied Electrochemistry 1, 11 pages, vol. 10, No. 1, Chapman and Hall, Ltd., Great Britain.

OnGuard™ XT Battery State-of-Health Monitor, article, 2003, 2 pages, Midtronics, Inc. P/N 156-983A.

Pozmantir, Stan and Serge, How It Works: Reed Switch Motor, website article, Jan. 7, 2003, 6 pages.

Robbins, Tim & Hawkins, John, Battery Model For Over-Current Protection Simulation of DC Distribution Systems, Telecommunications Energy Conference, 1994, 8 pages, IEEE.

Schlueter, W., Das elektrische Ersatzschaltbild des Bleiakkumulators unter Berücksichtigung erzwungener Elektrolytströmung, article, 1982, 7 pages, Archiv, vol. 4 , Issue 7,.

S.L. Debardelaben, A look at the Impedance of a Cell, Intelec ' 88—Tenth International communications Energy Conference, 30-Nov. 2, 1988, 6 pages, IEEE Catalog No. 88CH2653-4, Library of Congress, New Jersey, USA.

CHARGE INDICATOR

CROSS-REFERENCE TO RELATED PATENT APPLICATIONS

The present application claims the benefit of Germany Patent Application DE 10 2006 024 798.1 filed May 27, 2006, the entire disclosure of which is incorporated herein by reference.

BACKGROUND

The present invention relates to a charge indicator for an accumulator or battery that includes a liquid electrolyte.

Charge indicators are used for indicating the state of charge of the accumulator, such as, for example, of a lead accumulator (e.g., a lead-acid battery), in a simple manner readable on the observation area of the transparent inspection rod. This makes use of the fact that the specific weight of the electrolyte changes in dependence on the state of charge.

In the ball guidance channel, at least one ball having a specific weight is guided which matches the specific weight of the electrolyte at a predetermined state of charge. With a correct charge of the battery, the ball is lighter than the electrolyte and floats up in the oblique ball guidance channel. When the accumulator is discharged, the specific weight of the electrolyte drops and is lower than the specific weight of the ball so that the ball sinks down in the ball guidance channel.

DE 25 11 426 C2 discloses a charge indicator with oblique ball guidance channel which ends at the tip of the inspection rod. With an adequate charge of the accumulator, the ball floats up and becomes visible at the end of the inspection rod through the observation area at the first end. If the ball is colored, this makes it possible to implement a colored indication for the correct state of charge. Due to the reflection area at the second end of the inspection rod, an adequate filling level of the accumulator with the electrolyte also becomes visible. In the case where the electrolyte level has dropped to such an extent that the tip of the inspection rod is no longer immersed in the electrolyte, the conical areas of the tip of the inspection rod form a boundary face with air. A total reflection then occurs at the conical areas of the tip of the inspection rod so that the tip appears as a reflecting area, that is to say bright. When the filling level of the electrolyte is adequate and the material of the inspection rod is selected in such a manner that the coefficients of refraction of the inspection rod and of the electrolyte are approximately equal, no further total reflection is produced. There is thus an optical connection via the tip of the inspection rod to the dark inner space of the accumulator so that a dark area appears at the observation area.

EP 1 120 641 A2 and DE 102 24 662 C1 disclose a charge indicator of the type initially mentioned, with a ball guidance channel extending beyond the height of the tip of the inspection rod in the direction of the upper boundary wall of the ball cage. The ball guidance channel accommodates two balls with different specific weight which have different colors. In the discharged state of the accumulator, both balls are located at the lower end of the ball guidance channel as a result of which the upper ball comes to lie underneath the tip of the inspection rod. If there is sufficient electrolyte, the color of the upper ball (e.g., red) becomes recognizable at the observation area of the inspection rod. This indicates that the accumulator is discharged. In a medium state of charge, the upper ball floats up with lower specific weight than the lower ball and disappears from the field of view of the tip of the inspection rod to the upper end of the ball guidance channel whereas the lower ball due to its earlier specific weight does not yet float up in the ball guidance channel. Instead, the lower ball remains at the lower end of the ball guidance channel outside the field of view of the inspection rod. With an adequate electrolyte level, the color of the housing now becomes visible at the observation area. With a good state of charge, the lower ball also floats up and butts against the upper ball which has already floated up as a result of which it is positioned underneath the tip of the inspection rod. At the observation area, the color of the lower ball, e.g. green, is visible as a signal of a good state of charge.

One issue associated with certain conventional charge indicators is that gas bubbles are caught in the area of the tip in the inspection rod and cannot be removed. In the case of charge indications with one ball, it may happen that a gas bubble stays caught in front of the tip of the inspection rod and prevents the ball from rising to the tip of the inspection rod. In the case of charge indicators with two balls, the upper ball can get caught at the tip and be prevented from rising further beyond the tip in the direction of the upper boundary wall. This leads to an erroneous indication in the case of accumulators which are actually functional.

SUMMARY

An exemplary embodiment relates to a charge indicator for a battery having a liquid electrolyte. The charge indicator includes a transparent inspection rod comprising an observation area at a first end and a tip formed by a conical reflection area at a second end and a ball cage attached at the second end of the inspection rod and configured to allow electrolyte to flow therethrough. The ball cage includes front-end and lower boundaries and an upper boundary wall provided with an opening for the second end of the inspection rod. The ball cage also includes at least one ball guidance channel extending obliquely to a longitudinal axis of the inspection rod in the direction of the upper boundary wall, the ball guidance channel comprising upper and lower channel boundary walls and lateral channel boundaries. The ball cage further includes at least one ball provided in the ball guidance channel which has a defined specific weight. The ball cage further includes a gas bubble collection channel beginning between the first upper channel boundary wall of the ball guidance channel and the tip, the gas bubble collection channel extending from the lower area of the ball cage to the tip and extending obliquely toward the top to the upper boundary wall oppositely to the adjoining ball guidance channel at least from the tip. The gas bubble collection channel has in an upper area of the gas bubble collection channel a plurality of gas diversion areas running to the outsides of the ball cage in the direction of the upper area of the ball cage, starting from a central plane level with the tip.

DETAILED DESCRIPTION

Figure 1:
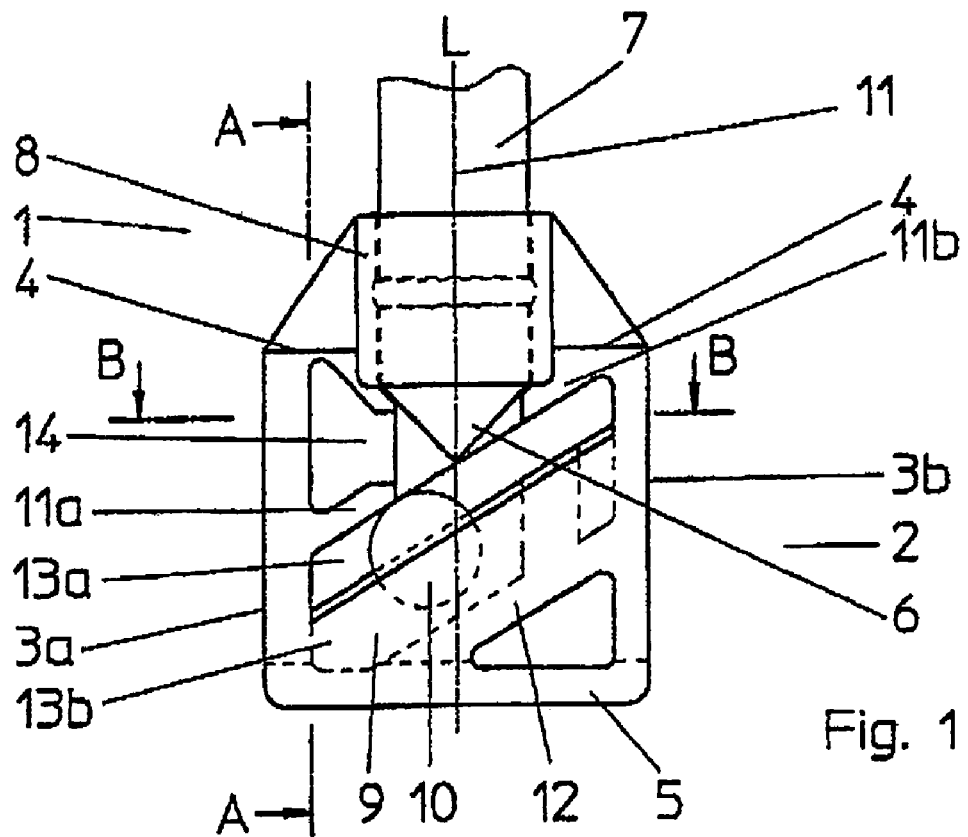
FIG. 1 shows a front view of a first embodiment of a charge indicator.

According to an exemplary embodiment, a charge indicator for an accumulator or battery (e.g., a lead-acid starting, lighting, and ignition battery) that includes a liquid electrolyte is provided with a transparent inspection rod which has at a first end an observation area and at a second end a tip, formed by a conical reflection area, and with a ball cage, which is attached at the second end of the inspection rod and through which the electrolyte flows, with front-end and lower boundaries and with a boundary wall provided with an opening for the second end of the inspection rod, and with at least one ball guidance channel, extending obliquely to the longitudinal axis of the inspection rod in the direction of the upper boundary wall, with upper and lower channel boundary walls and lateral boundaries for at least one ball which has a defined specific weight. One advantageous feature of such a configuration is that gas bubbles are removed better at the tip than may be possible using conventional charge indicators.

According to an exemplary embodiment, a charge indicator includes a ball cage that has a gas bubble collection channel beginning between the first upper channel boundary wall, extending from the lower area of the ball cage to the tip, of the ball guidance channel and the tip, which extends obliquely toward the top to the upper boundary wall oppositely to the adjoining ball guidance channel at least from the tip and has in the upper area of the gas bubble collection channel, gas diversion areas running to the outsides of the ball cage in the direction of the upper area of the ball cage, starting from a central plane level with the tip.

In contrast to the conventional charge indicators, the space between the conical reflection area of the tip is thus opened in the direction of the front area of the ball cage and a gas bubble collection channel is created through which gas bubbles can be removed from the tip into the upper area of the ball cage. The deciding factor is that the upper boundary wall of the ball cage which forms the upper boundary wall of the gas bubble collection channel runs from the central plane of the ball cage upward toward the outsides. For this purpose, slopes or (relatively large) radii toward the outside of the ball cage can be arranged at the highest tip of the internal space of the ball cage which divert the gas bubbles.

It has been found that the catching of gas bubbles in the area of the tip of the inspection rod can be prevented by this simple measure.

As already mentioned, the connecting gas diversion areas can extend radially or obliquely outward from the central plane to the outsides of the ball cage.

It is particularly advantageous if the gas diversion areas have a roughened surface. This leads to better wetability of the gas diversion areas and to its preventing the adhesion of gas bubbles to the gas diversion areas.

In a particular embodiment, the upper boundary wall, running in the direction of the lower boundary at the central plane, of the gas collection channel changes into a support wall extending perpendicularly in the direction of the lower boundary. The support wall has a narrow side pointing toward the tip so that the support wall provided for stabilization does not cause a significant impediment to rising gas bubbles.

The support wall can end, for example, at the first upper channel boundary wall of the ball guidance channel and can be integrally joined to this first upper channel boundary wall.

It is also advantageous if the second upper channel boundary wall, extending obliquely upward in the direction of the upper boundary wall from the tip, of the ball guidance channel adjoins the conical reflection area of the tip with a free intermediate space. That is, the angle of inclination of the conical reflection area with respect to the longitudinal axis of the inspection rod is smaller than the angle of inclination of the ball guidance channel with respect to the longitudinal axis of the inspection rod. In comparison with the conventional charge indicators, this considerably increases the free space around the tip so that this area of the tip of the inspection rod can be better flooded with electrolyte. This leads to a further reduction in the possibility of the adhesion of gas bubbles. The free intermediate space between the second upper channel boundary wall and the reflection area of the tip is achieved in that the height of the second upper channel boundary wall is reduced in comparison with the conventional charge indicators.

FIG. 1 shows a first embodiment of a charge indicator 1 from the front. The charge indicator 1 has a ball cage 2 through which an electrolyte (not shown) in the accumulator or battery flows. The ball cage 2 has a front and rear end boundary 3a, 3b and an upper boundary wall 4 and a lower boundary wall 5. The upper boundary wall 4 has an opening for a second end of an inspection rod 7 provided with a tip 6. The tip 6 of the transparent inspection rod 7 is formed by the conical reflection area.

The transparent inspection rod 7 is connected in fixed manner to the ball cage 2 in a guide 8 at the opening of the upper boundary wall 4.

In the ball cage 2, a ball guidance channel 9 for at least one ball 10 is also arranged. For this purpose, the ball guidance channel 9 has a first upper channel boundary wall 11a, extending from the lower area of the ball cage 2 up to the tip 6 and a second upper channel boundary wall 11b, extending from the tip in the direction of the upper edge of the ball cage 2 and ball guidance channel 9, and a lower channel boundary wall 12. Lateral boundaries 13a and 13b are provided for laterally guiding the at least one ball 10.

As can be seen from FIG. 1, the ball guidance channel 9 extends obliquely to the longitudinal axis 11 of the inspection rod. In this manner, the ball 10 can float upward obliquely with a defined specific weight in dependence on the state of charge of the electrolyte in the ball guidance channel 9 when the state of charge decreases.

In the ball cage 2, a gas bubble collection channel 14 is also provided which begins in an intermediate space between the first upper channel boundary wall 11 a and tip 6 and extends obliquely upward to the upper boundary wall 4 oppositely to the direction of extent of the ball guidance channel 9 at least from the tip 6. It can be seen that the gas bubble collection channel 14 is also expanded toward the bottom (i.e., forms a space which is enlarged starting from the opening into the ball guidance collection channel 9).

Figure 2:
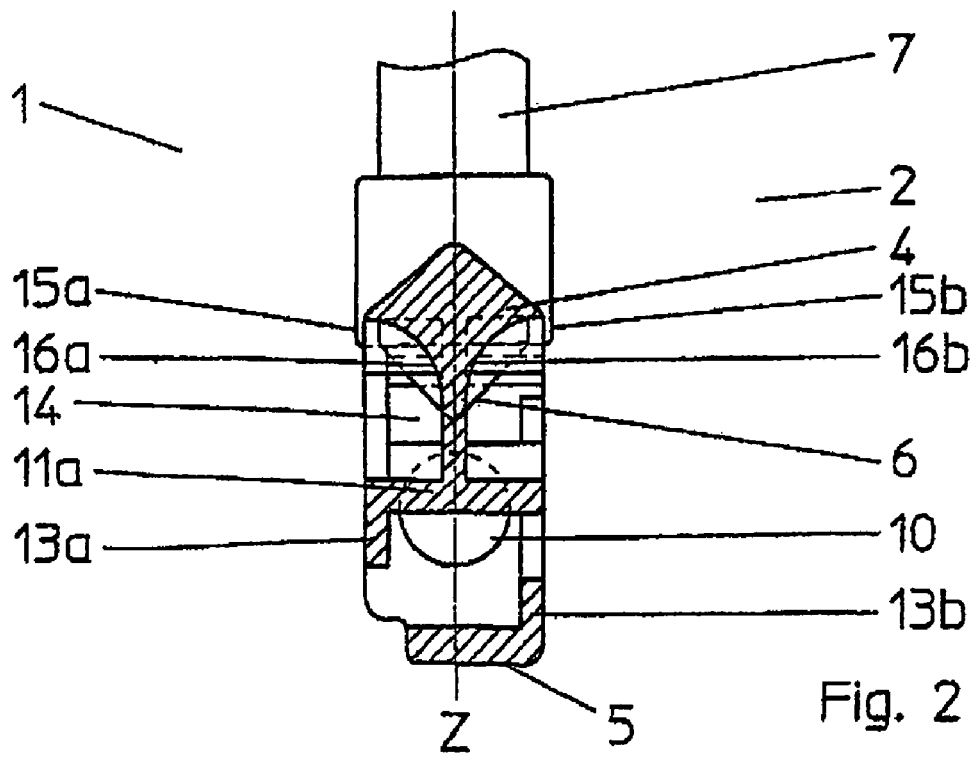
FIG. 2 shows a sectional view of the front of the charge indicator shown in FIG. 1.

FIG. 2 shows the charge indicator 1 from FIG. 1 in the section A-A of the front end. It becomes clear that the gas bubble collection channel 14 is closed at the top by the upper boundary wall 4. In the upper area of the gas bubble collection channel 14, the upper boundary wall 4 is formed in such a way that it has gas diversion areas 16a, 16b running to the outsides 15a, 15b of the ball cage 2 in the direction of the upper area of the ball cage 2 starting from a central plane Z level with the tip 6.

In the exemplary embodiments shown, the gas diversion areas 16a, 16b are formed by relatively large radii. The diversion of gas bubbles is considerably improved by the gas diversion areas 16a, 16b running toward the outside from the central plane Z.

Figure 3:
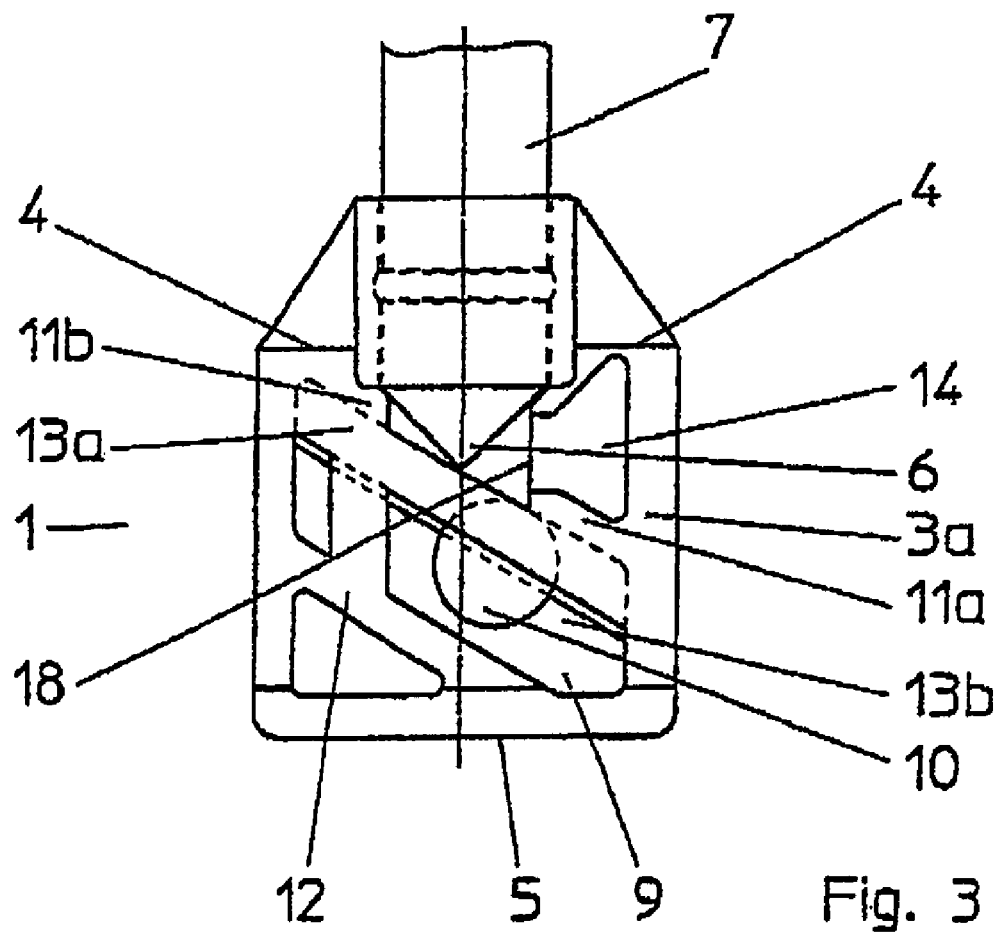
FIG. 3 shows a rear view of the charge indicator shown in FIG. 1.

FIG. 3 shows the exemplary embodiment of the charge indicator 1 from FIG. 1 as a rear view. The obliquely extending ball guidance channel 9 and the gas bubble collection channel 14 communicating with the ball guidance channel 9 again becomes clear.

Figure 4:
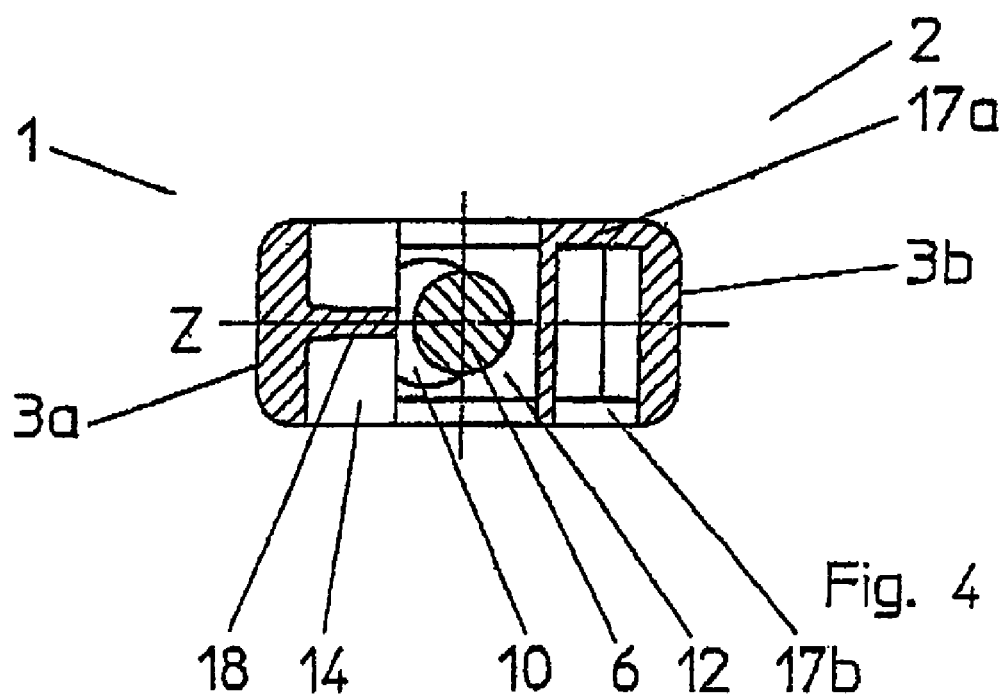
FIG. 4 shows a sectional view B-B of the charge indicator shown in FIG. 1 from the top.

FIG. 4 shows the charge indicator 1 from FIG. 1 in the section B-B in partial section. It becomes clear that a support wall 18 of the ball cage 2 is arranged as a narrow web in order to provide for good flooding through the ball cage 2.

It can also be seen that the lower channel boundary wall 12 is arranged as a full area between the lateral boundaries 17a, 17b of the ball cage 2. However, the lower and upper channel boundary wall 11, 12 can also be arranged optionally as a web in order to improve the rolling-off of the ball 10 in the ball guidance channel 9 and the flooding through the ball cage 2.

Figure 5:
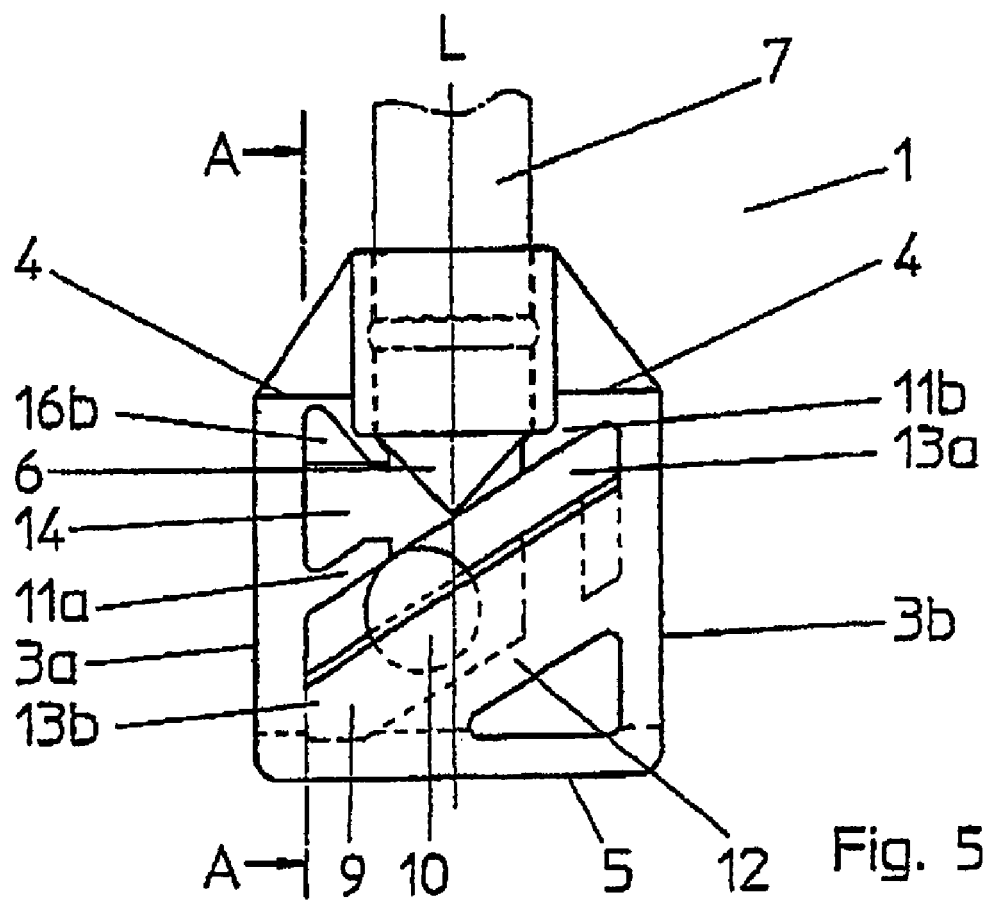
FIG. 5 shows the front view of a second embodiment of a charge indicator.

FIG. 5 shows a second embodiment of the charge indicator 1 from the front. In contrast to the charge indicator 1 from FIG. 1 according to the first embodiment, the gas diversion areas 16a and 16b are not curved radially from the center Z toward the outside 15a and 15b but are arranged as straight-line inclined planes.

Figure 6:
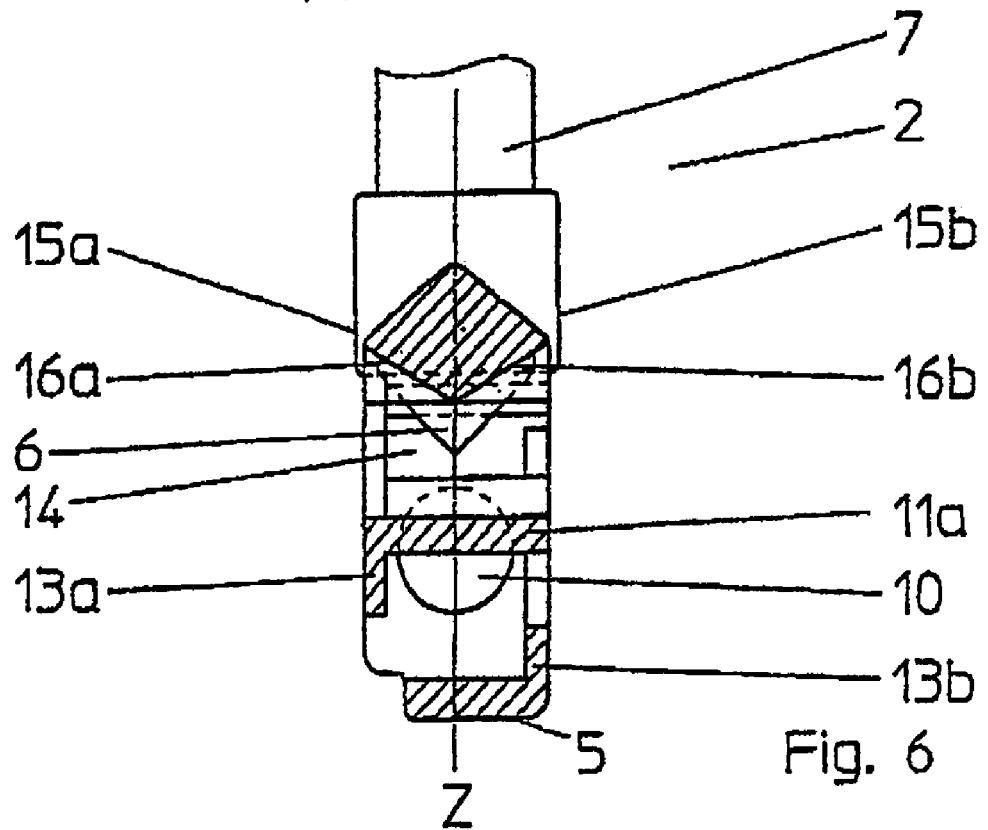
FIG. 6 shows a sectional view A-A of the front of the charge indicator shown in FIG. 5.

The gas diversion areas 16a, 16b running obliquely from the central plane Z to the outsides 15a, 15b of the ball cage 2 can be seen in FIG. 6 which shows the charge indicator 1 in section A-A to the end face.

Figure 7:
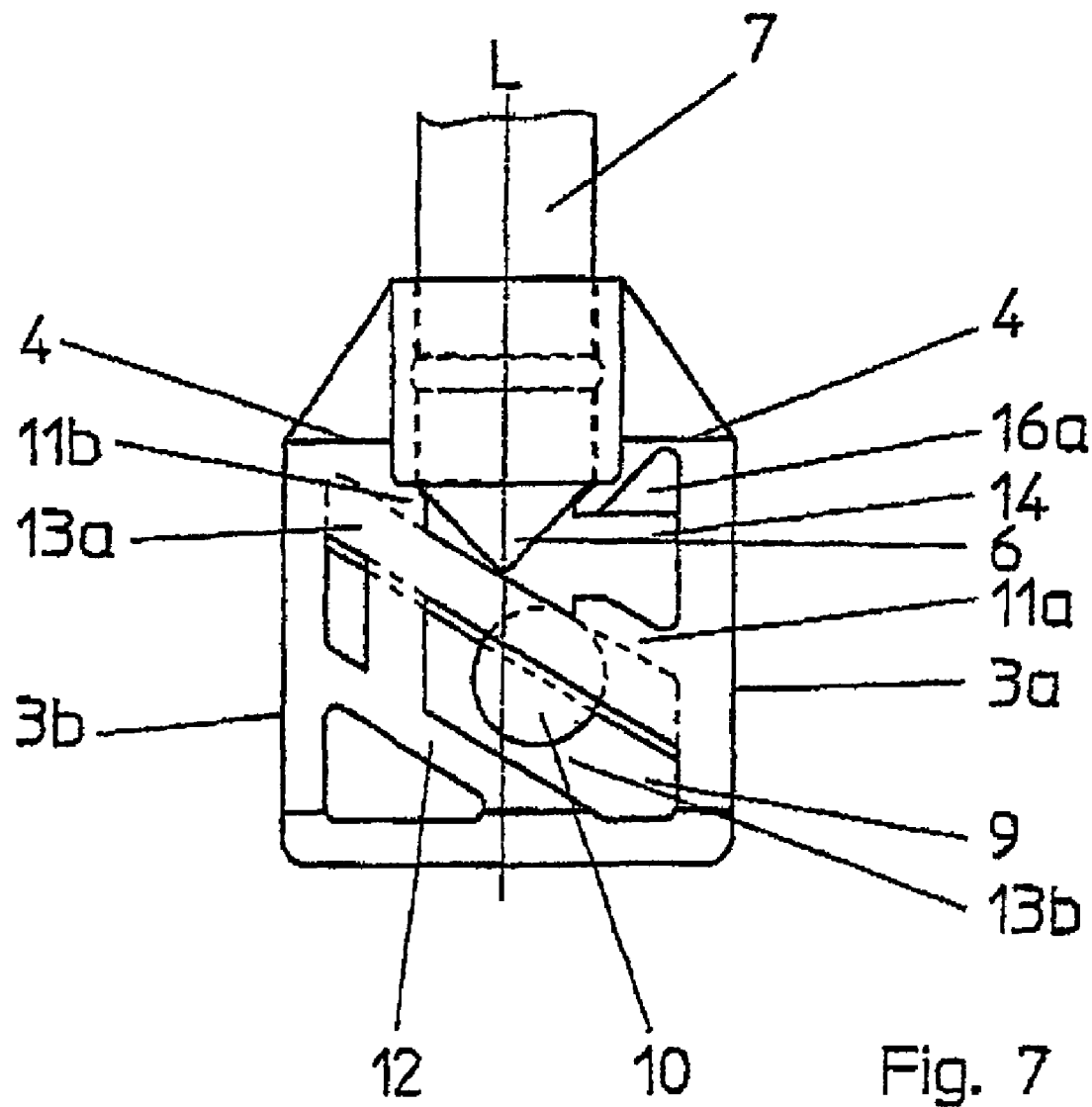
FIG. 7 shows a rear view of the charge indicator shown in FIG. 5.

FIG. 7 shows the charge indicator 1 from FIG. 5 from the rear. Here, too, it becomes clear that the ball guidance channel 9 extending obliquely to the longitudinal axis L opens into the gas bubble collection channel 14 which has at the upper end gas diversion areas 16a and 16b at the upper boundary wall 4.

Figure 8:
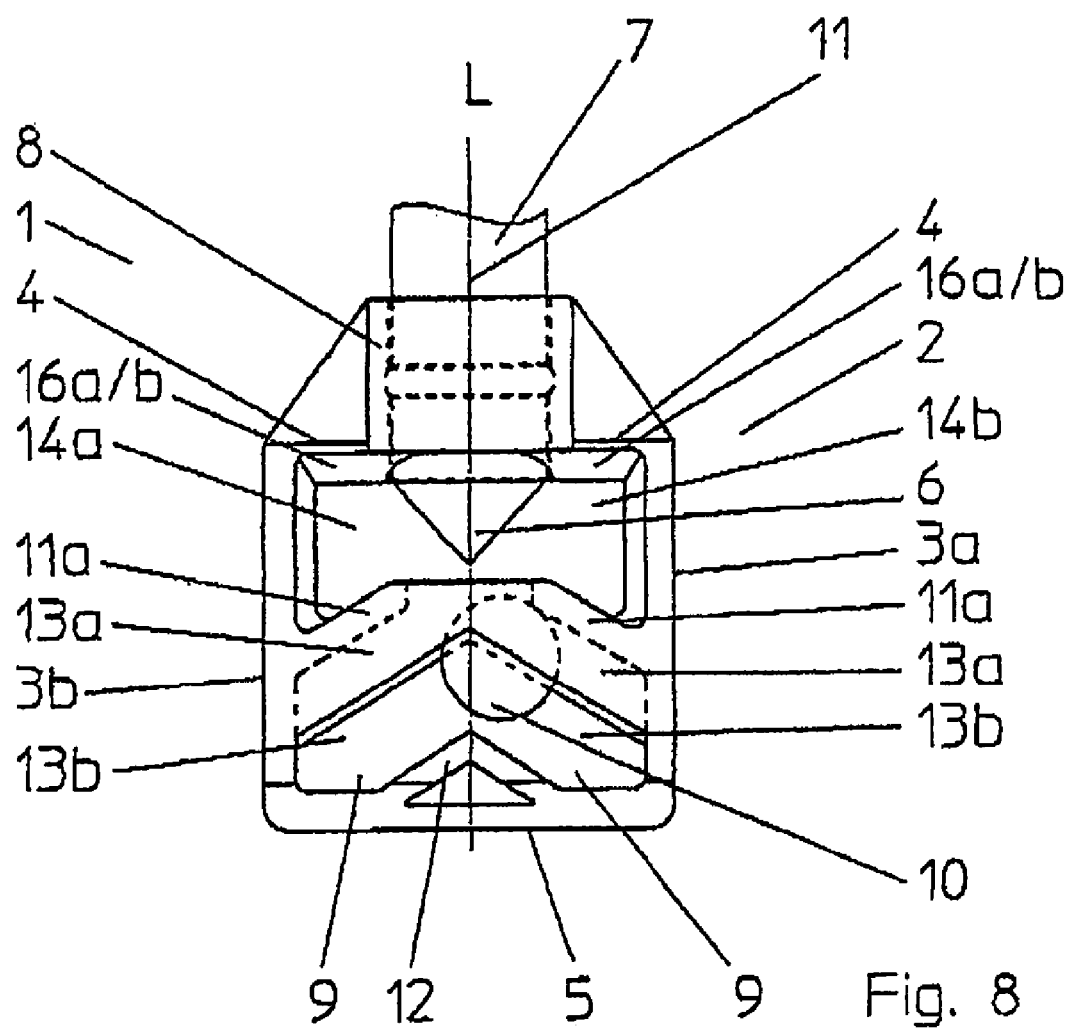
FIG. 8 shows a front view of a third embodiment of a charge indicator for a ball.

FIG. 8 shows a third embodiment of the charge indicator 1 for a ball 10 in a front view. It becomes clear that the ball guidance channel 9 has two sections, extending diagonally opposite to one another, which open into one another adjoining the tip 6. To divert gas bubbles, gas bubble collection channels 14a and 14b, which open into one another immediately adjoining the tip 6, are provided on both sides of the tip 6.

According to an exemplary embodiment, a charge indicator 1 for an accumulator provided with a liquid electrolyte, with a transparent inspection rod 7 which has at a first end an observation area and at a second end a tip 6 formed by a conical reflection area, and with a ball cage 2, which is attached at the second end of the inspection rod 7 and through which the electrolyte flows, with front-end and lower boundaries 3a, 3b, 5 and with an upper boundary wall 4 provided with an opening for the second end of the inspection rod 7 and with at least one ball guidance channel 9, extending obliquely to the longitudinal axis L of the inspection rod 7 in the direction of the upper boundary wall 4, with upper and lower channel boundary walls 11a, 11b, 12 and lateral channel boundaries 13 for at least one ball 10 which has a defined specific weight, is described. The ball cage 2 has a gas bubble collection channel 14, beginning between the first upper channel boundary wall 11a, extending from the lower area of the ball cage 2 to the tip 6, of the ball guidance channel 9 and the tip 6, which extends obliquely toward the top to the upper boundary wall 4 oppositely to the adjoining ball guidance channel 9 at least from the tip 6 and has in the upper area of the gas bubble collection channel 14, gas diversion areas 16a, 16b running to the outsides 15a, 15b of the ball cage 2 in the direction of the upper area of the ball cage 2, starting from a central plane Z level with the tip 6.

It should be noted that references to relative positions (e.g., "top" and "bottom") in this description are merely used to identify various elements as are oriented in the FIGURES. It should be recognized that the orientation of particular components may vary greatly depending on the application in which they are used.

For the purpose of this disclosure, the terms "coupled" and "attached" mean the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the charge indicator as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may be made in the design, operating conditions and arrangement of the various exemplary embodiments without departing from the scope of the present inventions as expressed in the appended claims.

What is claimed is:

1. A charge indicator for a battery having a liquid electrolyte comprising:

a transparent inspection rod comprising an observation area at a first end and a tip formed by a conical reflection area at a second end;

a ball cage attached at the second end of the inspection rod and configured to allow electrolyte to flow therethrough, the ball cage comprising:

front-end and lower boundaries;

an upper boundary wall provided with an opening for the second end of the inspection rod;

at least one ball guidance channel extending obliquely to a longitudinal axis of the inspection rod in the direction of the upper boundary wall, the ball guidance channel comprising upper and lower channel boundary walls and lateral channel boundaries; and at least one ball provided in the ball guidance channel which has a defined specific weight; and a gas bubble collection channel beginning between the first upper channel boundary wall of the ball guidance channel and the tip, the gas bubble collection channel extending from the lower area of the ball cage to the tip and extending obliquely toward the top to the upper boundary wall oppositely to the adjoining ball guidance channel at least from the tip;

wherein the gas bubble collection channel has in an upper area of the gas bubble collection channel a plurality of gas diversion areas running to the outsides of the ball cage in the direction of the upper area of the ball cage, starting from a central plane level with the tip.

2. The charge indicator of claim 1, wherein the gas diversion areas extend radially outward from the central plane to the outsides of the ball cage.

3. The charge indicator of claim 1, wherein the gas diversion areas extend obliquely outward from the central plane to the outsides of the ball cage.

4. The charge indicator of claim 1, wherein the gas diversion areas have a roughened surface.

5. The charge indicator of claim 1, wherein the upper boundary wall of the gas bubble collection channel, running in the direction of the lower boundary at the central plane, changes into a support wall extending perpendicularly in the direction of the lower boundary, which has a narrow side pointing toward the tip.

6. The charge indicator of claim 5, wherein the support wall ends at the first part of the ball guidance channel and is integrally joined to the first part of the ball guidance channel.

7. The charge indicator of claim 1, further comprising a second upper channel boundary wall of the ball guidance channel extending obliquely upward in the direction of the upper boundary wall from the tip and adjoining the conical reflection area of the tip with a free intermediate space and the angle of inclination of the conical reflection area with respect to the longitudinal axis of the inspection rod is smaller than the angle of inclination of the ball guidance channel with respect to the longitudinal axis of the inspection rod.

8. The charge indicator of claim 1, wherein the ball guidance channel is configured to have two balls provided therein and extends beyond the tip of the inspection rod in the direction of the upper boundary wall.

9. The charge indicator of claim 1, further comprising two ball guidance channels extending oppositely diagonally to one another and open into one another adjoining the tip.

* * * * *